(12) United States Patent
Herron

(10) Patent No.: US 8,620,791 B1
(45) Date of Patent: Dec. 31, 2013

(54) METHOD OF BROKERING TAX LIENS

(76) Inventor: Charles Herron, McKane, PA (US)

(*) Notice: Subject to any disclaimer, the term of this patent is extended or adjusted under 35 U.S.C. 154(b) by 136 days.

(21) Appl. No.: 12/932,042

(22) Filed: Feb. 15, 2011

Related U.S. Application Data

(63) Continuation of application No. 12/459,964, filed on Jul. 9, 2009, now abandoned, which is a continuation-in-part of application No. 11/712,631, filed on Feb. 28, 2007, now abandoned, which is a continuation-in-part of application No. 11/174,352, filed on Jun. 30, 2005, now abandoned.

(51) Int. Cl.
    *G06Q 40/00* (2012.01)
(52) U.S. Cl.
    CPC ..................................... *G06Q 40/00* (2013.01)
    USPC ...................................................... 705/36 R
(58) Field of Classification Search
    None
    See application file for complete search history.

(56) References Cited

U.S. PATENT DOCUMENTS

| | | | | |
|---|---|---|---|---|
| 7,584,129 B1* | 9/2009 | Peralta | ........................... | 705/35 |
| 8,010,439 B1* | 8/2011 | Davis | ............................. | 705/37 |
| 2005/0197947 A1* | 9/2005 | Tyson | ............................. | 705/36 |

* cited by examiner

*Primary Examiner* — Bruce I Ebersman
(74) *Attorney, Agent, or Firm* — Richard K Thomson

(57) ABSTRACT

Uncollected tax liens are made collateral for a loan to a public authority who buys the tax liens from the taxing district. The public authority assigns its right to receive monies obtained through the normal collections/property sale channels by the taxing district to the lender to payoff the outstanding note. Collection procedures remain unchanged except that the taxing district forwards receipts to the lender in satisfaction of the debt. Any questionable collections can be devalued/exempted from the total and up to 103% of the basis amount loaned to the taxing district. The taxing district agrees to repurchase unredeemed claims after a fixed period. The loan can be renewed annually by substituting the most recent year's liens for the oldest year's to re-figure the basis. An optional re-acquisition provision is included enabling the taxing district to repurchase of unpaid liens for 10% of face value, once the lender has been repaid.

4 Claims, 11 Drawing Sheets

CASH FLOW ANALYSIS OF LIEN REDEMPTION
YEAR 1

FACE OF TAXES

|       | year 1    | year 2    | year 3  | year 4 | Total     |
|-------|-----------|-----------|---------|--------|-----------|
| Jan   | 137,605   | 152,202   | 23,924  | 143    | 313,873   |
| Feb   | 137,605   | 152,202   | 23,924  | 143    | 313,873   |
| Mar   | 137,605   | 152,202   | 23,924  | 143    | 313,873   |
| Apr   | 137,605   | 152,202   | 23,924  | 143    | 313,873   |
| May   | 137,605   | 152,202   | 23,924  | 143    | 313,873   |
| June  | 137,605   | 152,202   | 23,924  | 143    | 313,873   |
| July  | 137,605   | 152,202   | 23,924  | 143    | 313,873   |
| Aug   | 137,605   | 152,202   | 23,924  | 143    | 313,873   |
| Sept  | 137,605   | 152,202   | 23,924  | 143    | 313,873   |
| oct   | 137,605   | 152,202   | 23,924  | 143    | 313,873   |
| nov   | 137,605   | 152,202   | 23,924  | 143    | 313,873   |
| Dec   | 137,605   | 152,202   | 23,924  | 143    | 313,873   |
| Total | 1,651,260 | 1,826,419 | 287,083 | 1,718  | 3,766,480 |
| PER CENT | 44.25% | 46.28%  | 7.44%   | 0.04%  |           |

INTEREST RECEIVED

|       | Year 1  | Year 2  | Year 3 | Year 4 | Total   |
|-------|---------|---------|--------|--------|---------|
| Jan   | 1,032   | 14,840  | 4,486  | 40     | 20,397  |
| Feb   | 2,064   | 15,981  | 4,665  | 41     | 22,751  |
| Mar   | 3,096   | 17,123  | 4,845  | 42     | 25,105  |
| Apr   | 4,128   | 18,264  | 5,024  | 43     | 27,459  |
| May   | 5,160   | 19,406  | 5,203  | 44     | 29,813  |
| June  | 6,192   | 20,547  | 5,383  | 45     | 32,167  |
| July  | 7,224   | 21,689  | 5,562  | 46     | 34,521  |
| Aug   | 8,256   | 22,830  | 5,742  | 47     | 36,875  |
| Sept  | 9,288   | 23,972  | 5,921  | 48     | 39,229  |
| oct   | 10,320  | 25,113  | 6,101  | 49     | 41,584  |
| nov   | 11,352  | 26,255  | 6,280  | 50     | 43,938  |
| Dec   | 12,384  | 27,396  | 6,459  | 52     | 46,292  |
| Total | 80,499  | 253,416 | 65,670 | 548    | 400,132 |

PENALTIES RECEIVED

|       | Year 1  | Year 2  | Year 3 | Year 4 | Total   |
|-------|---------|---------|--------|--------|---------|
| Jan   | 13,761  | 15,220  | 2,392  | 14     | 31,387  |
| Feb   | 13,761  | 15,220  | 2,392  | 14     | 31,387  |
| Mar   | 13,761  | 15,220  | 2,392  | 14     | 31,387  |
| Apr   | 13,761  | 15,220  | 2,392  | 14     | 31,387  |
| May   | 13,761  | 15,220  | 2,392  | 14     | 31,387  |
| June  | 13,761  | 15,220  | 2,392  | 14     | 31,387  |
| July  | 13,761  | 15,220  | 2,392  | 14     | 31,387  |
| Aug   | 13,761  | 15,220  | 2,392  | 14     | 31,387  |
| Sept  | 13,761  | 15,220  | 2,392  | 14     | 31,387  |
| oct   | 13,761  | 15,220  | 2,392  | 14     | 31,387  |
| nov   | 13,761  | 15,220  | 2,392  | 14     | 31,387  |
| Dec   | 13,761  | 15,220  | 2,392  | 14     | 31,387  |
| Total | 165,126 | 182,642 | 28,708 | 172    | 376,648 |

TOTAL RECEIVED

|       | Year 1    | Year 2    | Year 3  | Year 4 | Total     | Less TCB Fee | Net to Note |
|-------|-----------|-----------|---------|--------|-----------|--------------|-------------|
| Jan   | 152,398   | 182,261   | 30,802  | 197    | 365,658   | 18,283       | 347,375     |
| Feb   | 153,430   | 183,403   | 30,981  | 198    | 368,012   | 18,401       | 349,611     |
| Mar   | 154,462   | 184,544   | 31,160  | 199    | 370,366   | 18,518       | 351,848     |
| Apr   | 155,494   | 185,686   | 31,340  | 200    | 372,720   | 18,636       | 354,084     |
| May   | 156,526   | 186,827   | 31,519  | 202    | 375,074   | 18,754       | 356,320     |
| June  | 157,558   | 187,969   | 31,699  | 203    | 377,428   | 18,871       | 358,557     |
| July  | 158,590   | 189,110   | 31,878  | 204    | 379,782   | 18,989       | 360,793     |
| Aug   | 159,622   | 190,252   | 32,058  | 205    | 382,136   | 19,107       | 363,029     |
| Sept  | 160,654   | 191,393   | 32,237  | 206    | 384,490   | 19,225       | 365,266     |
| oct   | 161,686   | 192,535   | 32,416  | 207    | 386,844   | 19,342       | 367,502     |
| nov   | 162,718   | 193,676   | 32,596  | 208    | 389,198   | 19,460       | 369,738     |
| Dec   | 163,750   | 194,818   | 32,775  | 209    | 391,552   | 19,578       | 371,975     |
| Total | 1,896,885 | 2,262,476 | 381,461 | 2,438  | 4,543,260 | 227,163      | 4,316,097   |

Fig. 3A

YEAR 2
FACE OF TAXES

| | year 1 | year 2 | year 3 | year 4 | Total |
|---|---|---|---|---|---|
| Jan | | 143,918 | 24,468 | 125 | 168,511 |
| Feb | | 143,918 | 24,468 | 125 | 168,511 |
| Mar | | 143,918 | 24,468 | 125 | 168,511 |
| Apr | | 143,918 | 24,468 | 125 | 168,511 |
| May | | 143,918 | 24,468 | 125 | 168,511 |
| June | | 143,918 | 24,468 | 125 | 168,511 |
| July | | 143,918 | 24,468 | 125 | 168,511 |
| Aug | | 143,918 | 24,468 | 125 | 168,511 |
| Sept | | 143,918 | 24,468 | 125 | 168,511 |
| oct | | 143,918 | 24,468 | 125 | 168,511 |
| nov | | 143,918 | 24,468 | 125 | 168,511 |
| Dec | | 143,918 | 24,468 | 125 | 168,511 |
| TOTAL | | 1,727,013 | 293,616 | 1,505 | 2,022,134 |
| PER CENT | | 46.28% | 7.44% | 0.04% | |

INTEREST RECEIVED

| | Year 1 | Year 2 | Year 3 | Year 4 | Total |
|---|---|---|---|---|---|
| Jan | | 14,032 | 4,588 | 35 | 18,655 |
| Feb | | 15,111 | 4,771 | 36 | 19,918 |
| Mar | | 16,191 | 4,955 | 37 | 21,183 |
| Apr | | 17,270 | 5,138 | 38 | 22,446 |
| May | | 18,350 | 5,322 | 39 | 23,711 |
| June | | 19,429 | 5,505 | 40 | 24,974 |
| July | | 20,508 | 5,689 | 40 | 26,237 |
| Aug | | 21,588 | 5,872 | 41 | 27,501 |
| Sept | | 22,667 | 6,056 | 42 | 28,765 |
| oct | | 23,746 | 6,239 | 43 | 30,028 |
| nov | | 24,826 | 6,423 | 44 | 31,293 |
| Dec | | 25,905 | 6,606 | 45 | 32,556 |
| | | 239,623 | 67,164 | 480 | 307,267 |

PENALTIES RECEIVED

| | Year 1 | Year 2 | Year 3 | Year 4 | Total |
|---|---|---|---|---|---|
| Jan | | 14,392 | 2,447 | 13 | 16,851 |
| Feb | | 14,392 | 2,447 | 13 | 16,851 |
| Mar | | 14,392 | 2,447 | 13 | 16,851 |
| Apr | | 14,392 | 2,447 | 13 | 16,851 |
| May | | 14,392 | 2,447 | 13 | 16,851 |
| June | | 14,392 | 2,447 | 13 | 16,851 |
| July | | 14,392 | 2,447 | 13 | 16,851 |
| Aug | | 14,392 | 2,447 | 13 | 16,851 |
| Sept | | 14,392 | 2,447 | 13 | 16,851 |
| oct | | 14,392 | 2,447 | 13 | 16,851 |
| nov | | 14,392 | 2,447 | 13 | 16,851 |
| Dec | | 14,392 | 2,447 | 13 | 16,851 |
| | | 172,701 | 29,362 | 150 | 202,213 |

TOTAL RECEIVED

| | Year 1 | Year 2 | Year 3 | Year 4 | Total | Less TCB Fee | Net to Note |
|---|---|---|---|---|---|---|---|
| Jan | | 172,342 | 31,503 | 173 | 204,017 | 10,201 | 193,816 |
| Feb | | 173,421 | 31,686 | 174 | 205,281 | 10,264 | 195,017 |
| Mar | | 174,500 | 31,870 | 175 | 206,544 | 10,327 | 196,217 |
| Apr | | 175,580 | 32,053 | 176 | 207,808 | 10,390 | 197,418 |
| May | | 176,659 | 32,237 | 177 | 209,072 | 10,454 | 198,619 |
| June | | 177,738 | 32,420 | 177 | 210,336 | 10,517 | 199,819 |
| July | | 178,818 | 32,604 | 178 | 211,600 | 10,580 | 201,020 |
| Aug | | 179,897 | 32,787 | 179 | 212,864 | 10,643 | 202,220 |
| Sept | | 180,977 | 32,971 | 180 | 214,127 | 10,706 | 203,421 |
| oct | | 182,056 | 33,154 | 181 | 215,391 | 10,770 | 204,622 |
| nov | | 183,135 | 3,338 | 182 | 216,655 | 10,833 | 205,822 |
| Dec | | 184,215 | 33,521 | 183 | 217,919 | 10,896 | 207,023 |
| | | 2,139,337 | 390,142 | 2,135 | 2,531,615 | 126,581 | 2,405,034 |

Fig. 3B

Cash Flow Analysis of Lien Redemption
YEAR 3
FACE OF TAXES

| | year 1 | year 2 | year 3 | year 4 | Total |
|---|---|---|---|---|---|
| Jan | | | 23,136 | 128 | 23,265 |
| Feb | | | 23,136 | 128 | 23,265 |
| Mar | | | 23,136 | 128 | 23,265 |
| Apr | | | 23,136 | 128 | 23,265 |
| May | | | 23,136 | 128 | 23,265 |
| June | | | 23,136 | 128 | 23,265 |
| July | | | 23,136 | 128 | 23,265 |
| Aug | | | 23,136 | 128 | 23,265 |
| Sept | | | 23,136 | 128 | 23,265 |
| oct | | | 23,136 | 128 | 23,265 |
| nov | | | 23,136 | 128 | 23,265 |
| Dec | | | 23,136 | 128 | 23,265 |
| TOTAL | | | 277,636 | 128 | 279,175 |
| | | | 7.44% | 0.04% | |

INTEREST RECEIVED

| | Year 1 | Year 2 | Year 3 | Year 4 | Total |
|---|---|---|---|---|---|
| Jan | | | 4,338 | 36 | 4,374 |
| Feb | | | 4,512 | 37 | 4,548 |
| Mar | | | 4,685 | 38 | 4,723 |
| Apr | | | 4,859 | 38 | 4,897 |
| May | | | 5,032 | 39 | 5,072 |
| June | | | 5,206 | 40 | 5,246 |
| July | | | 5,379 | 41 | 5,421 |
| Aug | | | 5,553 | 42 | 5,595 |
| Sept | | | 5,726 | 43 | 5,770 |
| oct | | | 5,900 | 44 | 5,944 |
| nov | | | 6,073 | 45 | 6,118 |
| Dec | | | 6,247 | 46 | 6,293 |
| | | | 63,509 | 491 | 64,000 |

PENALTIES RECEIVED

| | Year 1 | Year 2 | Year 3 | Year 4 | Total |
|---|---|---|---|---|---|
| Jan | | | 2,314 | 13 | 2,326 |
| Feb | | | 2,314 | 13 | 2,326 |
| Mar | | | 2,314 | 13 | 2,326 |
| Apr | | | 2,314 | 13 | 2,326 |
| May | | | 2,314 | 13 | 2,326 |
| June | | | 2,314 | 13 | 2,326 |
| July | | | 2,314 | 13 | 2,326 |
| Aug | | | 2,314 | 13 | 2,326 |
| Sept | | | 2,314 | 13 | 2,326 |
| oct | | | 2,314 | 13 | 2,326 |
| nov | | | 2,314 | 13 | 2,326 |
| Dec | | | 2,314 | 13 | 2,326 |
| | | | 27,764 | 154 | 27,917 |

TOTAL RECEIVED / Less TCB

| | Year 1 | Year 2 | Year 3 | Year 4 | Total | Fee | Net to Note |
|---|---|---|---|---|---|---|---|
| Jan | | | 29,788 | 177 | 29,965 | 1,498 | 28,466 |
| Feb | | | 29,962 | 178 | 30,139 | 1,507 | 28,632 |
| Mar | | | 30,135 | 179 | 30,314 | 1,516 | 28,798 |
| Apr | | | 30,309 | 180 | 30,488 | 1,524 | 28,964 |
| May | | | 30,482 | 181 | 30,663 | 1,533 | 29,129 |
| June | | | 30,656 | 181 | 30,837 | 1,542 | 29,295 |
| July | | | 30,829 | 182 | 31,012 | 1,551 | 29,461 |
| Aug | | | 31,003 | 183 | 31,186 | 1,559 | 29,627 |
| Sept | | | 31,176 | 184 | 31,361 | 1,568 | 29,793 |
| oct | | | 31,350 | 185 | 31,535 | 1,577 | 2,995,830,124 |
| nov | | | 31,523 | 186 | 31,710 | 1,585 | 30,290 |
| Dec | | | 31,697 | 187 | 31,884 | 1,594 | 64,181 |
| | | | 368,908 | 2,184 | 371,092 | 18,555 | 352,537 |

Fig. 3C

CASH FLOW ANALYSIS OF LIEN REDEMPTION
YEAR 4
FACE OF TAXES

| | year 1 | year 2 | year 3 | year 4 | Total |
|---|---|---|---|---|---|
| Jan | | | | 121 | 121 |
| Feb | | | | 121 | 121 |
| Mar | | | | 121 | 121 |
| Apr | | | | 121 | 121 |
| May | | | | 121 | 121 |
| June | | | | 121 | 121 |
| July | | | | 121 | 121 |
| Aug | | | | 121 | 121 |
| Sept | | | | 121 | 121 |
| oct | | | | 121 | 121 |
| nov | | | | 121 | 121 |
| Dec | | | | 121 | 121 |
| TOTAL | | | | 1,455 | 1,455 |
| PER CENT | | | | 0% | |

INTEREST RECEIVED

| | Year 1 | Year 2 | Year 3 | Year 4 | Total |
|---|---|---|---|---|---|
| Jan | | | | 34 | 34 |
| Feb | | | | 35 | 35 |
| Mar | | | | 35 | 35 |
| Apr | | | | 36 | 36 |
| May | | | | 37 | 37 |
| June | | | | 38 | 38 |
| July | | | | 39 | 39 |
| Aug | | | | 40 | 40 |
| Sept | | | | 41 | 41 |
| oct | | | | 42 | 42 |
| nov | | | | 43 | 43 |
| Dec | | | | 44 | 44 |
| TOTAL | | | | 464 | 464 |

PENALTIES RECEIVED

| | Year 1 | Year 2 | Year 3 | Year 4 | Total |
|---|---|---|---|---|---|
| Jan | | | | 12 | 12 |
| Feb | | | | 12 | 12 |
| Mar | | | | 12 | 12 |
| Apr | | | | 12 | 12 |
| May | | | | 12 | 12 |
| June | | | | 12 | 12 |
| July | | | | 12 | 12 |
| Aug | | | | 12 | 12 |
| Sept | | | | 12 | 12 |
| oct | | | | 12 | 12 |
| nov | | | | 12 | 12 |
| Dec | | | | 12 | 12 |
| TOTAL | | | | 146 | 146 |

TOTAL RECEIVED

| | Year 1 | Year 2 | Year 3 | Year 4 | Total | Less TCB Fee | Net to Note |
|---|---|---|---|---|---|---|---|
| Jan | | | | 167 | 167 | 8 | 159 |
| Feb | | | | 168 | 168 | 8 | 160 |
| Mar | | | | 169 | 169 | 8 | 160 |
| Apr | | | | 170 | 170 | 8 | 161 |
| May | | | | 171 | 171 | 9 | 162 |
| June | | | | 172 | 172 | 9 | 163 |
| July | | | | 173 | 173 | 9 | 164 |
| Aug | | | | 173 | 173 | 9 | 165 |
| Sept | | | | 174 | 174 | 9 | 166 |
| oct | | | | 175 | 175 | 9 | 166 |
| nov | | | | 176 | 176 | 9 | 167 |
| Dec | | | | 177 | 177 | 9 | 168 |
| TOTAL | | | | 2,065 | 2,065 | 103 | 1,962 |

Fig. 3D

Cash Flow Analysis of Lien Redemption
ANALYSIS OF NOTE PAY DOWN

| INTEREST YEAR 1 | 0.035 |
|---|---|
| INTEREST YEAR 2 | 0.04 |
| INTEREST YEAR 3 | 0.045 |
| 90% | |

|  |  | Total Available | Interest | Principle | Note Balance | Face of Tax Balance | Loan to Security Tax Only | Total Lien Balance | loan to otal Len % |
|---|---|---|---|---|---|---|---|---|---|
|  |  |  |  |  | 5,941,493 | 6,387,548 | 0.00% |  |  |
| 1 |  | 347,375 | 17,329 | 330,046 | 5,611,447 | 6,073,674 | 92.39% | 6,994,320 | 80.23% |
| 2 |  | 349,611 | 16,367 | 333,245 | 5,278,203 | 5,759,801 | 91.64% | 6,669,506 | 79.14% |
| 3 |  | 351,848 | 15,395 | 336,453 | 4,941,750 | 5,445,927 | 90.74% | 6,339,985 | 77.95% |
| 4 |  | 354,084 | 14,413 | 339,670 | 4,602,079 | 5,132,054 | 89.67% | 6,005,755 | 76.63% |
| 5 |  | 356,320 | 13,423 | 342,898 | 4,259,182 | 4,818,181 | 88.40% | 5,666,818 | 75.16% |
| 6 | YEAR 1 | 358,557 | 12,423 | 346,134 | 3,913,048 | 4,504,307 | 86.87% | 5,323,172 | 73.51% |
| 7 |  | 360,793 | 11,413 | 349,380 | 3,563,668 | 4,190,434 | 85.04% | 4,974,818 | 71.63% |
| 8 |  | 363,029 | 10,394 | 352,635 | 3,211,033 | 3,876,561 | 82.83% | 4,621,756 | 69.48% |
| 9 |  | 365,266 | 9,366 | 355,900 | 2,855,133 | 3,562,687 | 80.14% | 4,263,986 | 66.96% |
| 10 |  | 367,502 | 8,327 | 359,175 | 2,495,958 | 3,248,814 | 76.83% | 3,901,508 | 63.97% |
| 11 |  | 369,738 | 7,280 | 362,458 | 2,133,500 | 2,934,941 | 72.69% | 3,534,322 | 60.37% |
| 12 |  | 371,975 | 6,223 | 365,752 | 1,767,748 | 2,621,067 | 67.44% | 3,162,428 | 55.90% |
| 13 |  | 193,816 | 5,892 | 187,923 | 1,579,824 | 2,452,556 | 64.42% | 2,976,805 | 53.07% |
| 14 |  | 195,017 | 5,266 | 189,751 | 1,390,074 | 2,284,045 | 60.86% | 2,788,655 | 49.85% |
| 15 |  | 196,217 | 4,634 | 191,584 | 1,198,490 | 2,115,534 | 56.65% | 2,597,977 | 46.13% |
| 16 |  | 197,418 | 3,995 | 193,423 | 1,005,067 | 1,947,023 | 51.62% | 2,404,771 | 41.79% |
| 17 | YEAR 2 | 198,619 | 3,350 | 195,268 | 809,799 | 1,778,512 | 45.53% | 2,209,038 | 36.66% |
| 18 |  | 199,819 | 2,699 | 197,120 | 612,679 | 1,610,000 | 38.05% | 2,010,777 | 30.47% |
| 19 |  | 201,020 | 2,042 | 198,978 | 413,701 | 1,441,489 | 28.70% | 1,809,988 | 22.86% |
| 20 |  | 202,220 | 1,379 | 200,841 | 212,860 | 1,272,978 | 16.72% | 1,606,672 | 13.24% |
| 21 |  | 203,421 | 710 | 202,712 | 10,148 | 1,104,467 | 92.00% | 1,400,828 | 72.00% |
| 22 |  | 204,622 | 34 | 204,588 | -194,440 | 935,956 | -20.77% | 1,192,456 | -16.31% |
| 23 |  | 205,822 | -648 | 206,471 | -400,910 | 767,445 | -52.24% | 981,557 | -40.84% |
| 24 |  | 207,023 | -1,336 | 208,359 | -609,270 | 598,933 | -101.73% | 768,130 | -79.32% |
| 25 |  | 28,466 | -2,285 | 30,751 | -640,021 | 575,669 | -111.18% | 742,483 | -86.20% |
| 26 |  | 28,632 | -2,400 | 31,032 | -671,053 | 552,404 | -121.48% | 716,487 | -93.66% |
| 27 |  | 28,798 | -2,516 | 31,314 | -702,368 | 529,140 | -132.74% | 690,142 | -101.77% |
| 28 |  | 28,964 | -2,634 | 31,598 | -733,965 | 505,875 | -145.09% | 663,448 | 110.63% |
| 29 | YEAR 3 | 29,129 | -2,752 | 31,882 | -765,847 | 482,611 | 158.69% | 636,404 | 120.34% |
| 30 |  | 29,295 | -2,872 | 32,167 | -798,014 | 459,346 | 173.73% | 609,013 | -131.03% |
| 31 |  | 29,461 | -2,993 | 32,454 | -830,468 | 436,082 | -190.44% | 581,272 | -142.87% |
| 32 |  | 29,627 | -3,114 | 32,741 | -863,209 | 412,817 | -209.10% | 553,182 | -156.04% |
| 33 |  | 29,723 | -3,237 | 33,030 | -896,238 | 389,552 | -230.07% | 524,743 | -170.80% |
| 34 |  | 29,958 | -3,361 | 33,319 | -929,557 | 366,288 | -280.79% | 495,955 | -187.43% |
| 35 |  | 30,124 | -3,486 | 33,610 | -963,167 | 343,023 | -311.82% | 466,818 | -206.33% |
| 36 |  | 30,290 | -3,612 | 33,902 | -997,069 | 319,759 | -313.16% | 437,332 | -227.99% |
| 37 |  | 159 | -3,739 | 3,898 | -1,000,967 | 319,637 | -314.50% | 439,562 | -227.72% |
| 38 |  | 160 | -3,754 | 3,913 | -1,004,880 | 319,516 | -315.85% | 441,791 | -227.46% |
| 39 |  | 160 | -3,768 | 3,929 | -1,008,809 | 319,395 | -317.21% | 444,017 | -227.20% |
| 40 |  | 161 | -3,783 | 3,944 | -1,012,753 | 319,274 | -318.57% | 446,242 | -226.95% |
| 41 | YEAR 4 | 162 | -3,798 | 3,960 | -1,016,713 | 319,152 | -319.93% | 448,465 | -226.71% |
| 42 |  | 163 | -3,813 | 3,976 | -1,020,689 | 319,031 | -321.31% | 450,686 | -226.47% |
| 43 |  | 164 | -3,828 | 3,991 | -1,024,680 | 318,910 | -322.69% | 452,906 | -226.25% |
| 44 |  | 165 | -3,843 | 4,007 | -1,028,687 | 318,788 | -324.07% | 455,123 | -226.02% |
| 45 |  | 166 | -3,858 | 4,023 | -1,032,711 | 318,667 | -324.07% | 457,339 | -225.81% |
| 46 |  | 166 | -3,873 | 4,039 | -1,036,750 | 318,546 | -325.46% | 459,553 | -225.60% |
| 47 |  | 167 | -3,888 | 4,055 | -1,040,805 | 318,425 | -326.86% | 461,765 | -225.40% |
| 48 |  | 168 | -3,903 | 4,071 | -1,044,876 | 318,303 | -328.26% | 463,975 | -225.20% |

Fig. 3E

METHOD OF BROKERING TAX LIENS

This application is a continuation of U.S. patent application Ser. No. 12/459,964 filed Jul. 9, 2009, now abandoned which is continuation-in-part of U.S. patent application Ser. No. 11/712,631 filed Feb. 28, 2007 now abandoned, which is a continuation-in-part of U.S. patent application Ser. No. 11/174,352 filed Jun. 30, 2005 now abandoned.

BACKGROUND AND SUMMARY OF THE INVENTION

The present invention is directed to a method of doing business. More particularly, the present invention is directed to a method of turning a liability (unpaid taxes) into a marketable asset and securing financing based on the collective value of those assets.

Budgeting at the local government level is a veritable nightmare given that moneys for funding schools, roads and other civic needs, which flow from federal and state sources in good times, can dry up when things do not go according to plan up the food chain. Compound that with the fact that job losses and other personal financial crises can result in property owners withholding tax payments which are due the taxing district, and a huge monkey wrench is thrown into a budget. Budgets are based on anticipated income and when a significant percentage of anticipated tax revenues are unpaid, expenses may outstrip income. In addition, collection procedures are typically quite lengthy. Normally, after taxes are six months past due, delinquency notices are mailed by the taxing district, with subsequent notices being mailed in some districts, advising the owner that their property may be subjected to a tax sale to satisfy the delinquency. Actual sales can be delayed until the taxes are 2 to 3 years past due. Needless to say, waiting up to three years to collect anticipated income destroys the budgeting process for the year in which the taxes are delinquent and two years thereafter (assuming the tax payer continues not to make timely tax payments). Even though late payment of taxes can carry a penalty and accrue interest for the delinquency period, this fails to make up for the absence of payment of the funds in the fiscal year when payment was anticipated. Total funding shortfall can accumulate into the millions of dollars for a taxing district over several year period.

The present inventive method proposes to turn a liability (the unpaid tax bill) into a marketable asset for the taxing district and use the collective uncollected tax bills for several previous fiscal years as collateral to secure a loan to supplant the lost revenue. Taxing district, as used herein, can include schools, counties, cities and special districts. Since most financial institutions are reluctant to lend monies secured by unpaid taxes, given the "iffy-ness" of repayment, to implement this transaction, the intervention of a civic-minded agency forms a necessary ingredient. Finally, given 1) the fact that neither civic-minded public authorities nor banks are simply going to "crawl out of the woodwork" and 2) the fact that most taxing districts are unaware that their uncollected taxes can be turned into a marketable asset, a broker is needed to pull all the pieces of this puzzle together and allow this transaction to take place.

The business method of the present invention requires a broker to take the steps of finding a public authority willing to buy tax liens held by a taxing district to provide immediate funding for the taxing district; negotiating a purchase price for outstanding tax liens as a percentage of a basis defined as the liens between agreed dates for marketable properties; securing a lender willing to loan the purchase price to the buyer for a set closing cost amount and at a negotiated interest rate for agreed upon term.

Typically, the agreement will necessarily include a provision whereby the taxing district continues to administer collection procedures on deficient taxes and uses the funds obtained thereby to repay the loan. The broker will also negotiate a provision such that the loan agreement is renewable annually by replacing the oldest year's tax liens with the most recent year's liens for the re-computed purchase price on the new basis.

The method typically includes the step of negotiating a buy-back provision in which the taxing district agrees to resume ownership of the tax liens by paying the amount still owed the lender after a fixed number of months following the most recent renewal of the loan agreement. Finally, the broker will negotiate an opt out provision with the taxing district in which, once the lender has been fully repaid, the taxing district has the option a) to acquire all outstanding liens for a negotiated percentage of their face amount (i.e., 10%) or, alternatively, b) to leave authority to collect the leans with the acquiring public agency.

Various other features, advantages and characteristics of the present invention will become apparent to one of ordinary skill in the art after a reading of the following specification.

BRIEF DESCRIPTION OF THE DRAWINGS

The preferred embodiment(s) of the present invention is/are described in conjunction with the associated drawings in which like features are indicated with like reference numerals and in which

FIGS. 3A-3E set out the cash flow analysis for lien redemption for the in accordance with the computer model used in conjunction with the present invention.

DETAILED DESCRIPTION OF PREFERRED EMBODIMENT(S)

Figure 1:
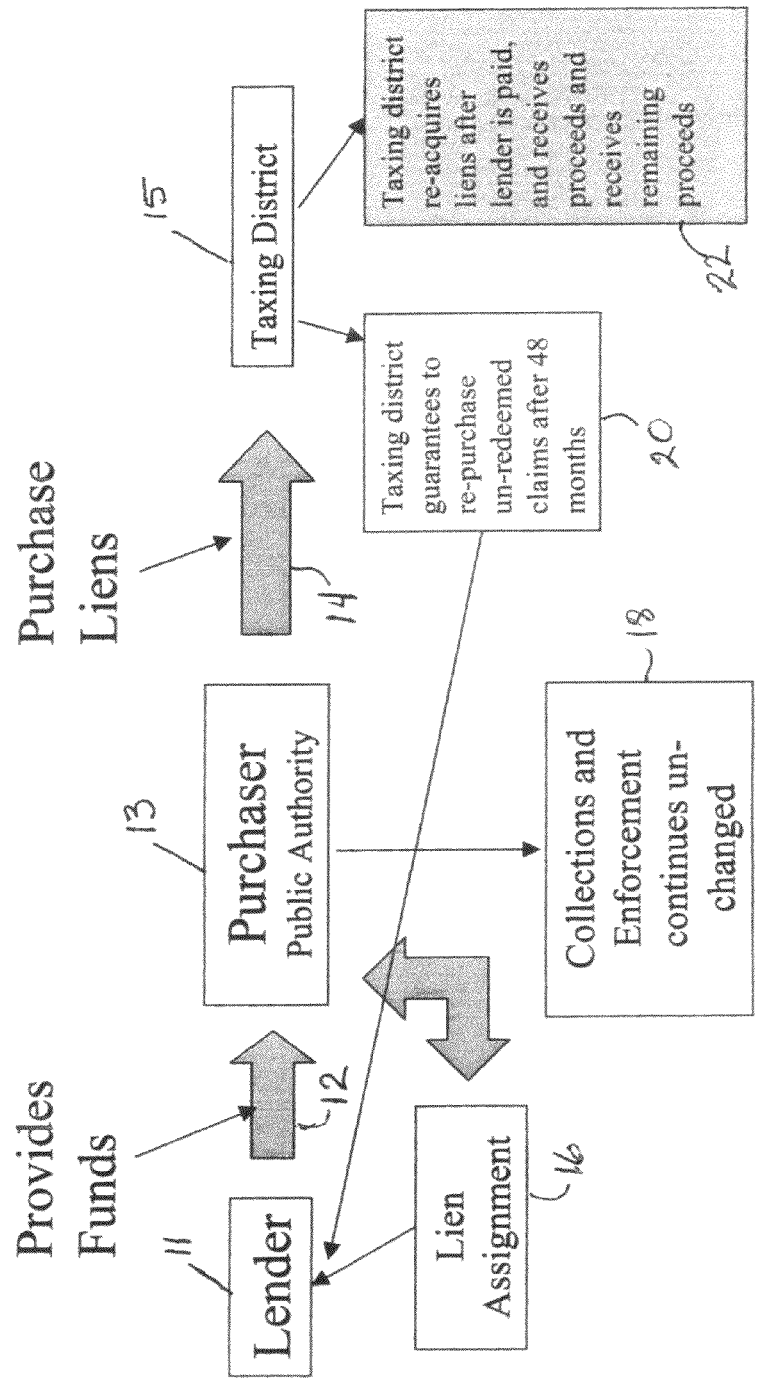
FIG. 1 is a flow chart depicting an exemplary transaction.
Figure 2A:
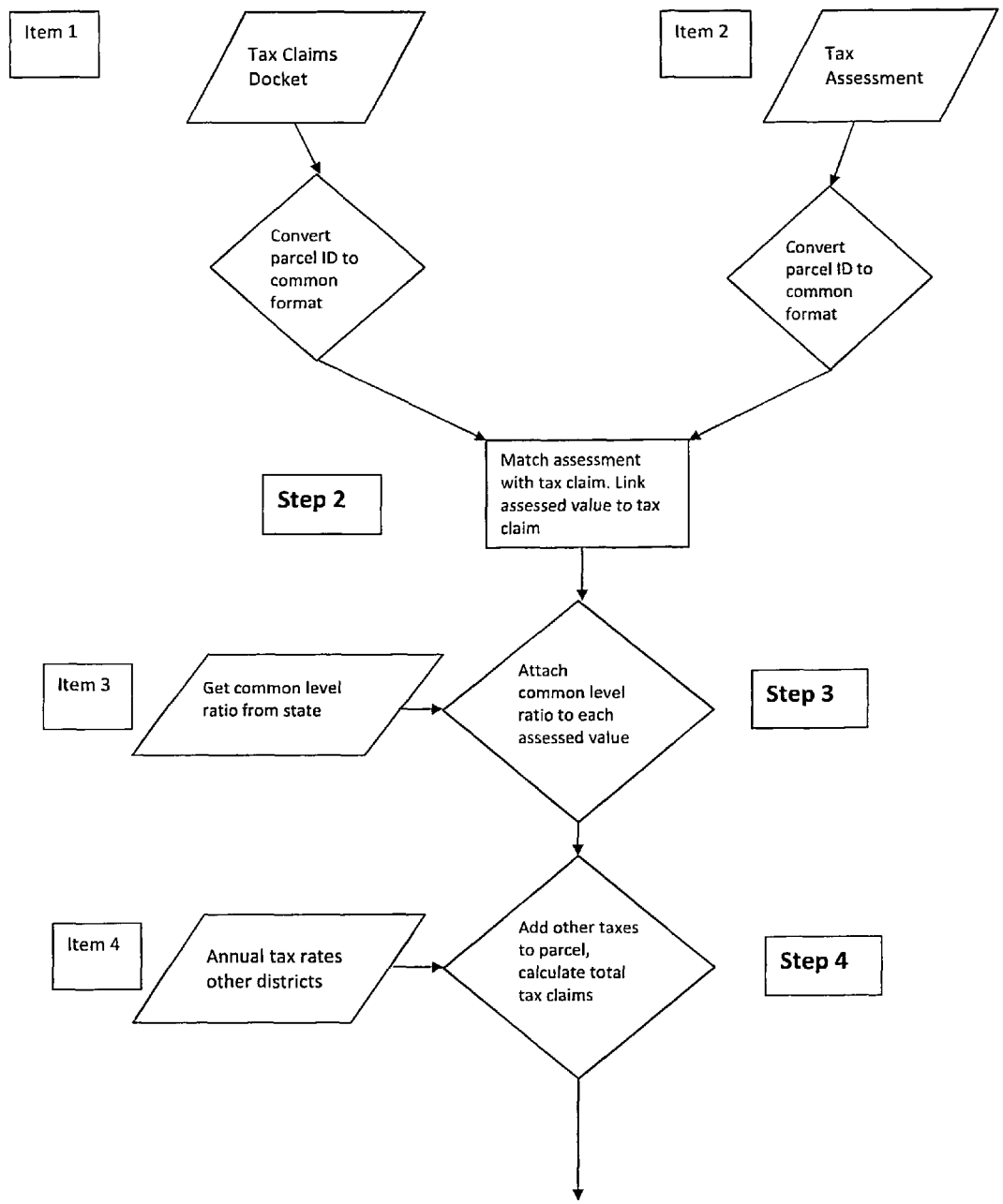
FIGS. 2A-2E depict graphically Steps 1-10 set forth herein after.
Figure 2B:
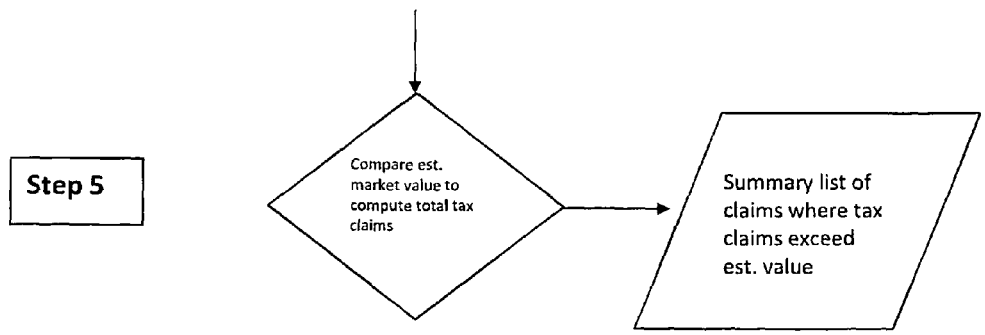
Figure 2B:
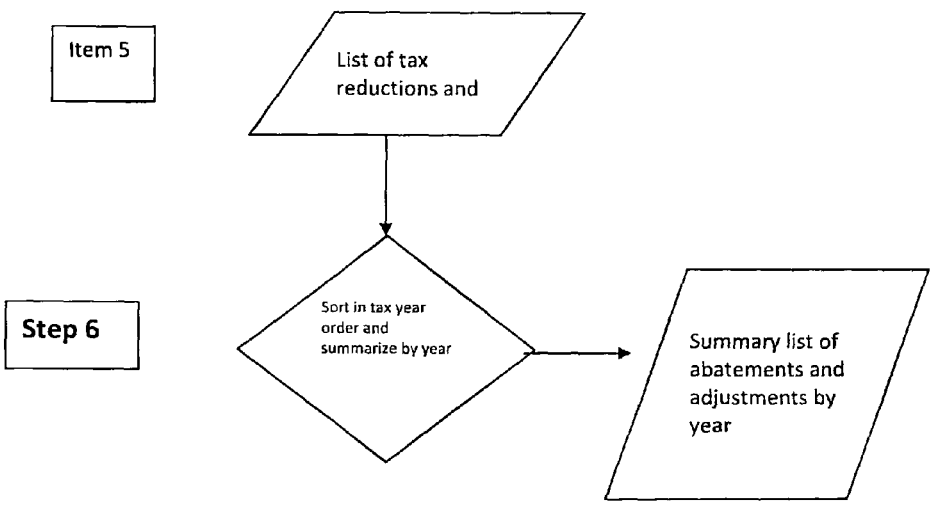
Figure 2C:
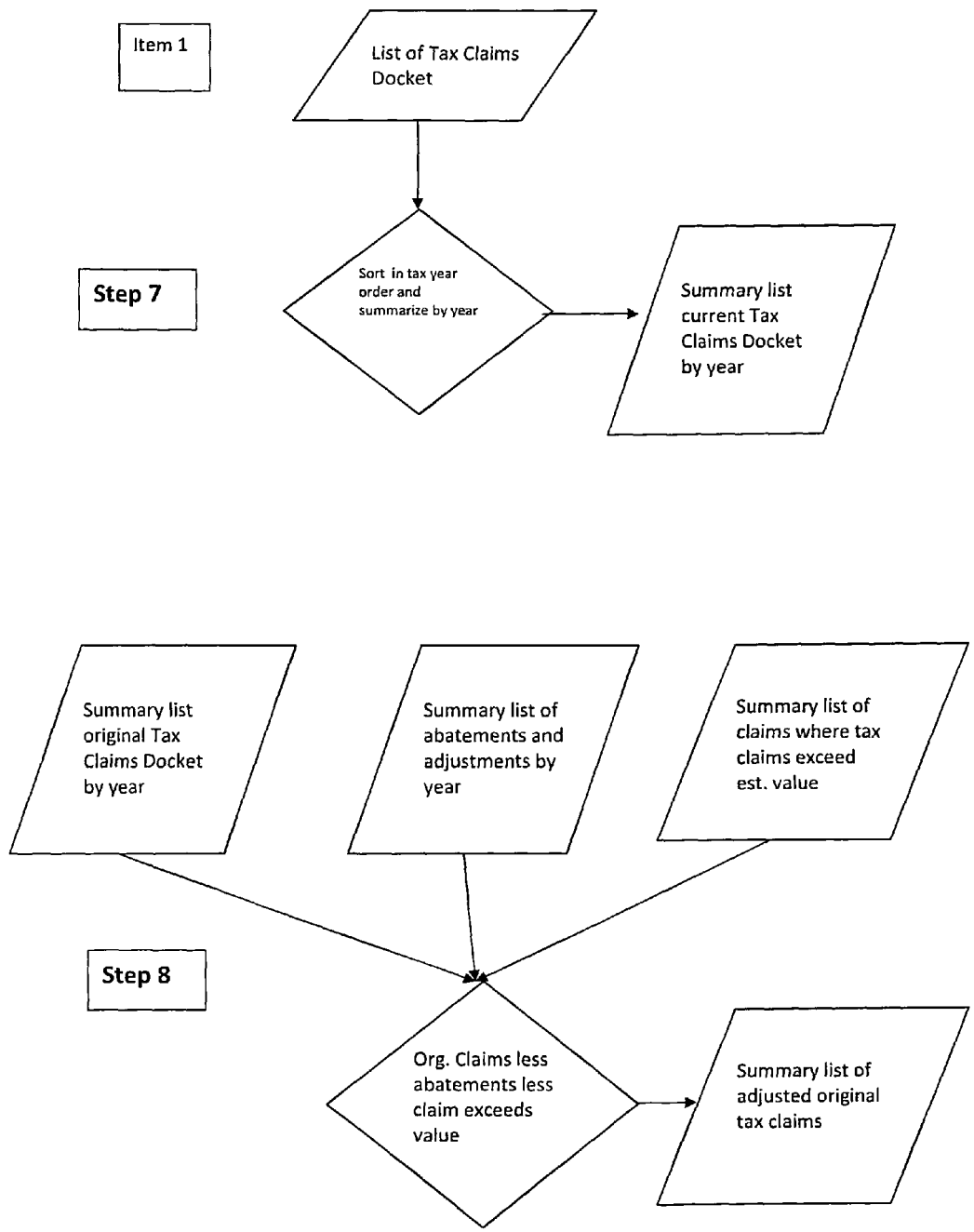
Figure 2D:
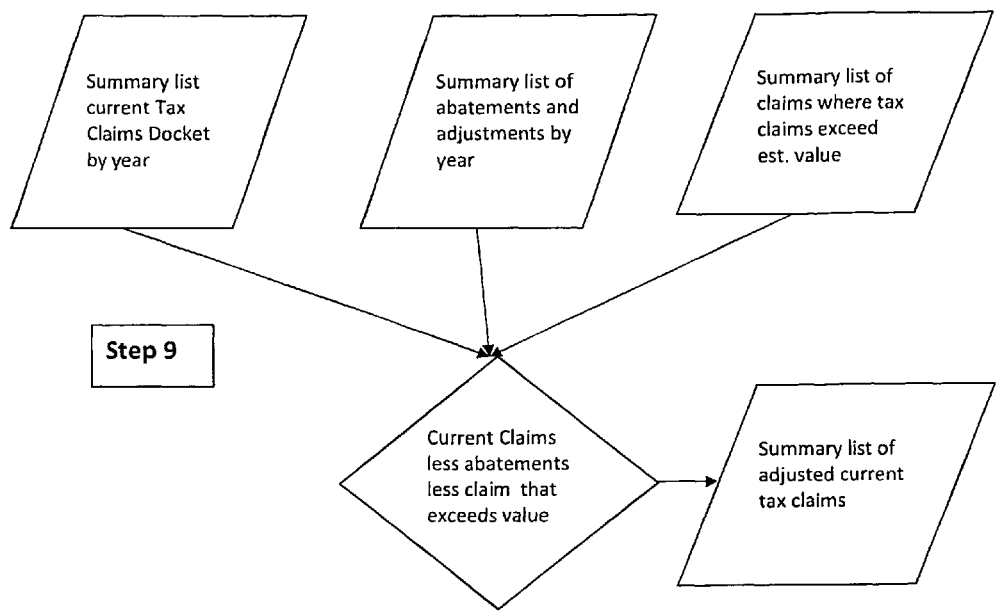
Figure 2E:
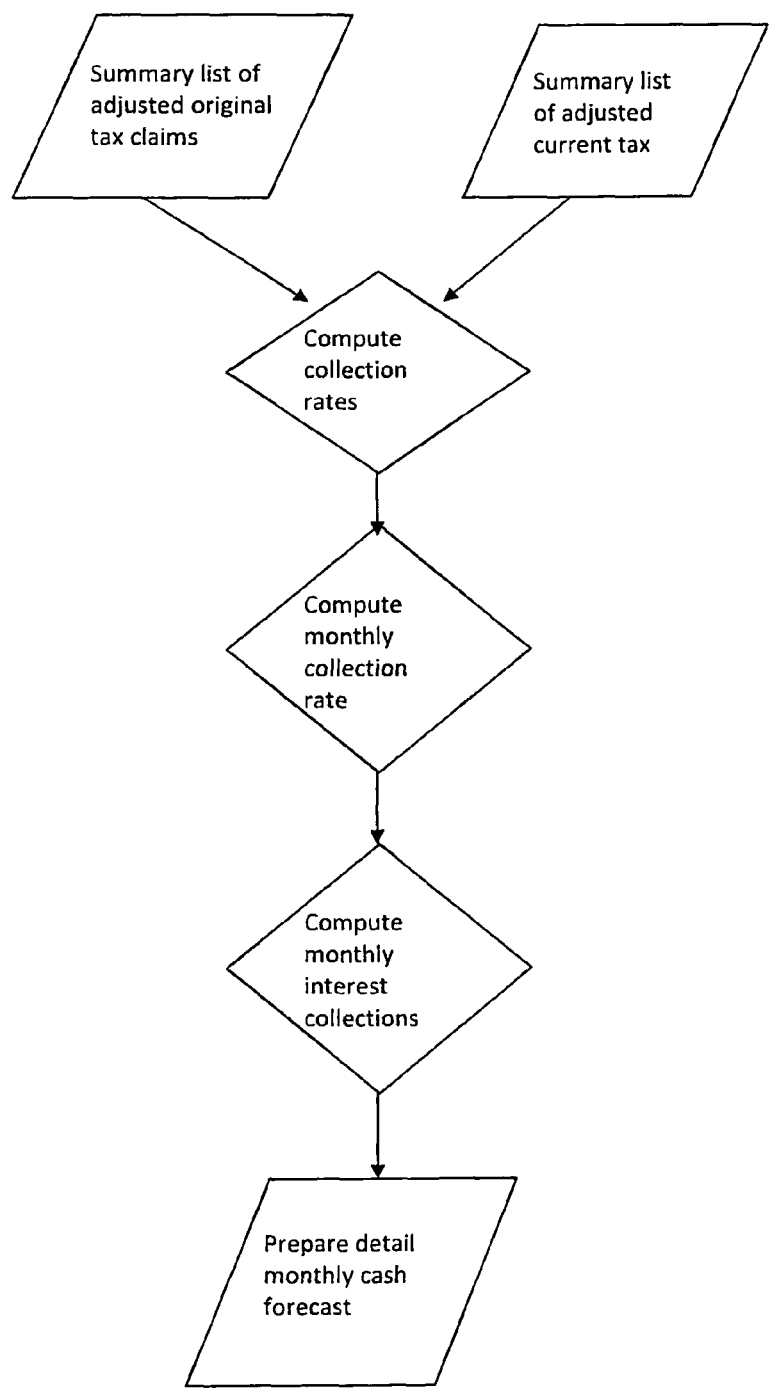

The method of the present invention involves a certain amount of salesmanship. The brokering agent must make a presentation to the taxing district to educate them on the availability, benefits, and nuances of brokering their tax liability into spendable cash. In point of fact, to date, over half the states have legislation which permits the type of transaction envisioned herein, with legislation pending in several other states.

Once a willing seller has been identified, the broker must now "create" a buyer. In most instances, this merely requires additional salesmanship on the part of the broker to push a public agency's "civic duty button", to motivate an existing agency to step up and become the buyer of the tax liens so the taxing district can obtain the funding necessary to carry out budgeted projects. However, in at least one deal brokered by the inventor, it became necessary to create a tax exempt entity to function as the buyer. The broker negotiates a "purchase price", a percentage of the total tax liens outstanding for a given time period, say for example, the most recent 5 years. This price is determined taking into consideration the following factors: 1) the historical collection rates of the taxing district; 2) pending assessment challenges that could negatively impact the collectible amount; 3) properties which may have environmental concerns or other issues which could negatively impact the amount obtained in a foreclosure sale.

Once a buyer and seller are identified, it becomes necessary to bring a lender on board to finance the transaction. This is where the broker's real negotiation skills are brought to bear. The concept needs to be sold to the bank, the interest rate negotiated on a revolving line of credit and the negative impact on the lender's willingness to accept risks associated with the three factors enumerated above minimized to, thereby, maximize the purchase price which the lender is willing to underwrite. Currently, the purchase price ranges up to 90% of the outstanding tax liens. In some instances, taxing districts are able to produce a collection rate of 98%; however, these collections are achieved over a period of 3 or more years leaving the budget shortfall which, in effect, burdens the taxpayers who make timely payments. The inventive method of the present invention provides the taxing district immediate funds for accomplishing the agenda underlying its budget.

It is an important feature of this business method that the transaction is invisible: there is no change apparent to the property owners since the taxing district continues to administer the collection procedures sending out notices, receiving collections and managing the property sales process. The only change is that in the month following collections, the amount is forwarded to the lender by the taxing district and the lender instructed to apply it against the buyer's note.

Another important factor used in persuading a lender to underwrite the loan is the buyout provision: the taxing district agrees to repurchase any outstanding liens for the price owed the lender 30 days prior to maturity date of the loan, typically 48 months after signing the agreement. The taxing district can postpone that date by annually renewing the transaction. This is done by replacing the oldest tax year with the most recent delinquencies and multiplying the total by the selling percentage (i.e., 90%). This may result in the taxing district receiving a new loan for more than the present year's delinquencies. In addition, it ultimately leads to the taxing district receiving more than the originally negotiated purchase price of 90% of the tax liens.

Generally, the loan agreement will also include an optional buy out provision. Once the loan has been fully repaid, the taxing district has the option to repurchase the remaining unpaid liens from the public agency for say, 10% of the remaining value or, alternatively, the taxing district may allow the agency to retain ownership for a possible redevelopment program, or the like.

The Figure depicts a flow chart of the modified transaction. Lender 11 provides funds to purchaser 13 which is typically a public authority (or non-profit company established to make purchase) to "buy" the tax liens from the taxing district 15. The steps are performed by the lender 11 providing funds, as indicated at 12, with which the purchaser 13 purchases the liens from the taxing district 15, as indicated at 14. Purchaser 13 agrees to assign its right to receive tax receipts to the lender 11 as indicated at 16. In addition, the purchaser 13 agrees to leave the collection procedures and enforcement by the tax district 15 for 12-24 months, as indicated at 18. In the method set forth in the parent application, the taxing district 15 agreed to guarantee re-purchase of the un-redeemed claims after 48 months from closing for, say 10% of their remaining value, after the lender has been paid in full. Since the taxing district has incurred no liability, it has no filing requirement. The third party purchaser, the public agency, is not subject to state filing requirements.

In this revised method, at the option of the taxing district, the buy back provision may be omitted from the agreement for a reduction in the purchase price. This figure may be nominally 25% of the value of the tax liens, i.e., the purchase price is reduced from 90% to 65% of their value. An additional 2% fee is paid to the broker. Similarly, the broker can assume/delegate the collection of the tax liens for an additional 2% fee, as shown at 19. Typically, the broker will hire out the filing of the alternative collection procedures as shown at 21, i.e., the actual law suits and service of process by the sheriff to a law firm, with the proceeds being received by the taxing district as at 22.

This business method is currently being marketed under the moniker Tax Lien Management Program. It has the distinct advantage or providing funding in the tax year for which monies have been budgeted while the normal tax lien process will not provide funds for up to three years later, if the collection/sale procedures are successful at all. The delays associated with the current process, puts a significant strain on the budgeting process. The business method of the present invention turns the uncollected tax liability/lien into a marketable asset which serves as collateral for a loan. This is a particularly attractive option for taxing districts whose uncollected taxes may leave them choosing between deep cuts in programs and filing bankruptcy.

The rate of collection on tax claims is the result of when the various functions are performed. Collecting Real Estate Tax Claims is a tightly structured process regulated by state statutes. These statutes prescribe specific timeline for the legal collection process to take place. The specific processes include but are not limited to:

Verification and audit of the tax collectors
Certification of Tax Claims
Legal Publications
Certified Mailing to property owners
Preliminary sale to satisfy claims
Sheriff or Judicial sale to clear title The state statutes prescribe numerous timelines for some of the above processes to take place. However, each county performing collections, has in place their individual procedures, personnel, software and past practices that impact how quick the tax claims are actually managed under the state statutes. The Counties are organized politically with their own elected commissioners. Great latitude is exercised by each county how aggressive or compassionate the collection process is managed. In addition, the quality of the underlying data providing assessment information resulting in the tax bills influences the quality of the collections. Individual counties and delinquent tax collectors are repetitive in their processes and procedures. The personnel and computer systems in place in each delinquent collector's office carries out the functions the same time each year. When the delinquent collectors perform tax sales, they are scheduled in their respective county or office the same month each year as time is available in the courts, and local sheriff office. In other words once a county has establishes September as the month for legal publications, this is the same month each year. The same is true when tax sales are scheduled.

Traditionally, financing a purchase of a pool of Real Estate Tax Claims has not been an a+ rated transaction. Financing this type of asset purchase has followed more of a path of delinquent accounts, or at best a more conservative model used for revolving lines of credit on trade receivables. Due to the statutory ability to enforce collection of tax claims and the mandated addition of interest, the security provided by a pool of tax claims can be significantly in there is a method to demonstrate the growing value of the security provided by the tax claims compared to the declining loan balance used to finance the purchase.

A mathematical process with computer modeling has been invented that analyzes all the data available resulting from the collection results. This computer model takes the raw data related to tax claims which can be as small a database as ten thousand claims or more than several hundred thousand claims, and provide a result that forecasts how much of the tax claims will be collected, and the rate of collection, along with the interest to be paid by the delinquent taxpayers. This result is then used to induce financial intuitions into lending millions of dollars using the tax claims as collateral. The benefit to the taxing district is huge when this computer model is utilized because the taxing district can maximize the revenue from a tax claim sale compared to a sale negotiated between a private company, or any other type of sale such as a bid process. When a taxing district sells tax claims to a private company, the total amount of the sale proceeds are drastically reduced to provide not only a large profit for the purchaser, but the taxing district is not sophisticated enough to know what a reasonable allowance for uncollectible tax claims should be, or how much revenue the pool of tax claims should provide. With this invention, the sale can be structured between a public authority independent of the taxing district, using only the tax claims as security for financing, and result in an estimated increase in revenues from this type of sale between 20%-30% more that a sale to a private company.

To determine a price for the initial, and subsequent purchases, a computer analysis of the current data representing the pool of tax clams being purchased is prepared utilizing computer models invented by the author. The data then can forecast what amount of the tax claims will actually be redeemed either by the property owner or other financially interested party. Determining how the pool of tax claims will be liquidated after the pool of tax claims is purchased is critical to determining how much interest the delinquent taxpayer will pay. The net interest paid by the delinquent taxpayer in excess of the interest paid by the purchaser on the money borrowed to fund the purchase will determine how much arbitrage earnings will be available to fund uncollectible accounts.

Pools of tax claims may include anywhere between 500 to 250,000 (or more) individual delinquent parcels. Due to the sheer magnitude of the number of tax claims, it would be impossible to perform any analysis without software created to model redemptions, let alone calculate future interest earnings to be paid by the delinquent taxpayer, and resulting interest to be paid by the purchaser, on funds borrowed to finance the purchase of the pool of tax claims.

The data required to prepare a model for the purposes of acquiring and financing the tax claims includes:
Tax claims docket for the taxing district.
Real Estate Tax Assessment data base for taxing district
The database containing the common level ratio for the taxing district
Tax rates for all taxing districts
List of tax reductions and abatements authorized by governing board action. (Usually related to economic development programs approved at county or state level.)
Gross beginning tax claims by year for taxing district each of the last five years.

Step 1

The database containing the tax claims docket and the database containing the real estate tax assessment have to be matched to determine the individual value of the real estate associated with the tax claim. These databases are from different computer systems. In order to match the assessment data with the tax claims data the information that enables the computer to match the two databases must be analyzed and the parcel identifying information needs to be rewritten from the format the data comes from into a common format for linking purposes.

Steps included in the process of changing the formats of the two databases include converting the file formats so both are in a text or numerical format depending on the parcel identifying method used. This also includes eliminating extra spaces, hyphens, and any other character that would prevent a computer match.

Step 2

Once the computer looks at each character and puts it in the correct format for matching, then the two databases are compared and the assessment value is attached to the tax claim.

Step 3

The assessment amount does not contain a value that reflects current market values. The assessment values are the estimated market value on the date the re-assessment occurred. Many time the re-assessment date is many years and often decades prior to a sale of tax claims. The state agency overseeing real estate assessments publishes a table of data that can be used to convert assessment values to a current estimated market value.

This program applies the correct common level ratio to each individual assessment value to compute a current estimated market value for each property.

Step 4

The Tax claims purchased represent one of three taxing districts that have liens on the individual property. The total amount of tax claims for all taxing entities is determined by applying the tax rate for the other two taxing districts to the assessed value, and adding this to the tax claim shown on the tax claim docket. This calculation is performed for each year since the tax rates vary each year. The result will be to have the total amount of tax claims for all taxing districts by year.

Step 5

This step summarizes all tax claims for all years and taxing districts to determine the total tax claims on each property. The total tax claims is then compared to the estimated market value determined in step 3 to identify claims where the tax claims exceed the estimated market value for each property. This data is summarized by tax claim year. An example of this information is as follows:

| Tax year | Tax Claims Exceed Value |
|---|---|
| 2004 | 7200 |
| 2005 | 7000 |
| 2006 | 7500 |
| 2007 | 8000 |
| 2008 | 8500 |

Step 6

This step summarizes the List of tax reductions and abatements authorized by governing board action by tax year. The result looks as follows:

| Tax Year | Total Abatements, etc. |
|---|---|
| 2004 | 65,000 |
| 2005 | 125,000 |
| 2006 | 20,000 |
| 2007 | 21,000 |
| 2008 | 23,000 |

Step 7

This step sorts the current list of tax claims by tax year and summarizes the claims by tax year. Following is an example:

| Tax Year | Total Current Tax Claims |
|---|---|
| 2004 | 137,567 |
| 2005 | 221,893 |
| 2006 | 393,190 |
| 2007 | 2,229,303 |
| 2008 | 3,763,162 |

Step 8

This step computes a revised list of original tax claims summarized by tax year. The data relating to the original gross tax claims by year are adjusted using the summaries by year computed in the previous steps for abatements and adjustments, and the summaries where the claims exceed the estimated market values. An example follows:

| Tax Year | Original Claims | Abatements, etc. | Tax Claims Exceed Value | Adjusted Original Claims |
|---|---|---|---|---|
| 2004 | 4,025,650 | 65,000 | 7,200 | 3,953,450 |
| 2005 | 4,537,534 | 125,000 | 7,000 | 4,405,534 |
| 2006 | 3,886,142 | 20,000 | 7,500 | 3,858,642 |
| 2007 | 3,975,453 | 21,000 | 8,000 | 3,946,453 |
| 2008 | 3,763,162 | 23,000 | 8,500 | 3,731,662 |

Step 9

This step computes a revised list of current tax claims summarized by tax year. An example is as follows:

| | Total Current Tax Claims | Abatements etc. | Tax claims exceed value | Adjusted Current Claims |
|---|---|---|---|---|
| 2004 | 137,567 | 65,000 | 7,200 | 65,367 |
| 2005 | 221,893 | 125,000 | 7,000 | 89,893 |
| 2006 | 393190 | 20,000 | 7,500 | 365,690 |
| 2007 | 2,229,303 | 21,000 | 8,000 | 2,200,303 |
| 2008 | 3,763,162 | 23,000 | 8,500 | 3,731,662 |

Step 10

Now that the raw data has been adjusted for the factors known currently that impact the amount to be collected, this data is used to provide a historical rate of collection. This data provides the basis to have the computer prepare a model of future cash flows, and how these cash flows can pay the debt used to finance a purchase of tax claims, and provide a margin of security, and rate of return to a lending institution favorable to the selling taxing district. An example follows:

| | Adjusted Original Claims | Adjusted Current | Percent Outstanding | % From Year |
|---|---|---|---|---|
| 2004 Total | 3,953,450 | 65,367 | 1.65% | 0.39% |
| 2005 Total | 4,A05,534 | 89,893 | 2.04% | 7.44% |
| 2006 Total | 3,858,642 | 365,690 | 9.48% | 46.28% |
| 2007 Total | 3,946,A53 | 2,200,303 | 55.75% | 44.25% |
| 2008 Total | 3,731,662 | 3,J31,662 | 100.00% | |

The column titled % Change from previous year, represents the percent collected of the original tax claims after adjustments for known issues that prevent collecting money from the claims. In order to compute an accurate cash flow, including interest to be collected from the tax claim as it is paid, the % Change is divided by 12 to produce a monthly collection rate. Preparing a monthly cash flow projection is also required for financing purposes when the lender requires monthly or quarterly debt service on the money borrowed to finance the purchase.

The computer creates a table showing the remaining balance of the tax claims monthly. The accrued interest is calculated and added to the face and penalties. This total due from the tax claims represents the total available receivable from the tax claim to secure the loan used to purchase the pool of tax claims This table is integrated with a program created to amortize a loan using the tax claims as security. The loan amortization is synchronized with the forecast of collections from the tax claims, and the calculated outstanding balance with accrued interest on the tax claims to demonstrate how the lender is secured from the beginning of the financing on the purchase throughout the life of the loan.

FIG. 3A-E is the printed result of the computer computations of using the collection rates. The charts shown in Tables A and B reflect the difference this new method produces versus the old conventional method. The first chart (Table A) shows the traditional lending approach by financial institutions for receivable financing. This computer generated model shows the financing entity advancing 90% plus the costs of the transaction (90% debt service). The summary chart shows the cash flows from the collections will retire the note in less than two years. There will still be $1.4 million in tax claims outstanding once the loan is paid.

TABLE A

|  | Interest | Principal | Total | Loan Balance | Value of Tax Claims | Security to loan % |
|---|---|---|---|---|---|---|
| Beginning |  |  |  | 5,941,493 | 7,314,425 | 81.23% |
| Year 1 | 142,352 | 4,173,745 | 4,316,097 | 1,767,748 | 3,162,428 | 55.90% |
| Year 2 | 28,017 | 1,625,395 | 1,653,412 | 0 | 1,400,828 | 0.00% |
| Total | 170,369 | 5,799,140 | 5,969,510 |  |  |  |

The second chart (Table B) shows a summary of the debt service is the advance rate on the financing is moved up to 103% of the face amount of the taxes. This shows the financing institution will be paid off in less than three years and still have $437,332 in tax claims available.

TABLE B

|  | Interest | Principal | Total | Loan Balance | Value of Tax Claims | Security to loan % |
|---|---|---|---|---|---|---|
| Beginning |  |  |  | 6,771,874 | 7,314,425 | 92.58% |
| Year 1 | 171,886 | 4,144,211 | 4,316,097 | 2,627,663 | 3,162,428 | 83.09% |
| Year 2 | 63,051 | 2,341,983 | 2,405,034 | 285,680 | 768,130 | 37.19% |
| Year 3 | 5,968 | 285,680 | 291,648 | 0 | 437,332 |  |
| Total | 240,906 | 6,771,874 | 7,012,780 |  |  |  |

The value to the taxing district with this computer generated model yields revenue from a sale of the tax claims very close to the face value of the tax claims. Traditional tax claim sales have only yielded 70-75% of face value to a taxing district. In the example above, the additional 20-25% amounts to nearly a million dollars in spendable principal which may be the difference between completing a project and not being able to afford to initiate it.

Various changes, alternatives and modifications will become apparent to one of ordinary skill in the art following a reading of the foregoing specification. It is intended that any such changes, alternatives and modifications as fall within the scope of the appended claims be considered part of the present invention.

I claim:

1. A method of brokering tax liens comprising the steps of
   a) utilizing a computer to determine a total value of current existing tax liens held by a particular taxing district, from an oldest year's tax liens to a most recent year's tax liens, using the total value to compute a basis for a loan;
   b) finding a public agency willing to buy the current existing tax liens held by a taxing district to provide immediate funding for the taxing district, the public agency being designated as buyer;
   c) negotiating a purchase price for the existing tax liens as a percentage of a basis, the basis being specifically defined as the total value of those existing tax liens between agreed dates for marketable properties;
   d) securing a lender willing to loan the purchase price to the buyer via a revolving line of credit for a set closing cost amount and at a negotiated interest rate for an agreed upon term;
   e) utilizing a computer to determine a combined principle and interest payment due monthly on a resulting loan;
   f) securing an agreement of the buyer to allow existing collection and enforcement procedures established by the taxing district to remain in place for a duration of the loan;
   g) negotiating a provision such that the loan agreement is renewable annually by replacing the oldest year's tax liens with a most recent year's liens creating a newly calculated basis, using a computer to recompute an adjusted purchase price on the newly calculated basis;
   h) securing signatures of all parties to a loan agreement.

2. The method of claim 1 further comprising the step of negotiating a provision whereby the buyer assigns its rights to receive monies collected on the liens by the taxing district to the lender as repayment for the loan.

3. The method of claim 1 further comprising the step of negotiating a buy-back provision in which the taxing district agrees to resume authority over the tax liens by paying an amount after a fixed number of months following the most recent renewal equal to the adjusted purchase price minus an amount of payments made during the fixed number of months.

4. The method of claim 1 further comprising the additional step of negotiating an opt out provision with the taxing district in which, once the lender has been fully repaid, the taxing district has the option
   a) to acquire all outstanding liens for a negotiated percentage of their face amount or, alternatively,
   b) to leave authority to collect the liens with the buyer.

* * * * *